US005898424A

United States Patent [19]

Flannery

[11] Patent Number: 5,898,424
[45] Date of Patent: *Apr. 27, 1999

[54] POINTING DEVICE WITH DIFFERING ACTUATION FORCES FOR PRIMARY AND SECONDARY BUTTONS

[75] Inventor: Michael R. Flannery, Sioux City, Iowa

[73] Assignee: Gateway 2000, Inc., North Sioux City, S. Dak.

[*] Notice: This patent issued on a continued prosecution application filed under 37 CFR 1.53(d), and is subject to the twenty year patent term provisions of 35 U.S.C. 154(a)(2).

[21] Appl. No.: 08/720,527

[22] Filed: Sep. 30, 1996

[51] Int. Cl.⁶ .................................................. G06F 3/033
[52] U.S. Cl. ........................ 345/163; 345/161; 345/167; 345/173
[58] Field of Search .............................. 345/157–167, 345/173–178; 341/27

[56] References Cited

U.S. PATENT DOCUMENTS

| 5,006,836 | 4/1991 | Cooper | 345/163 |
|---|---|---|---|
| 5,153,571 | 10/1992 | Takahashi | 345/163 |
| 5,157,381 | 10/1992 | Cheng | 345/163 |
| 5,355,148 | 10/1994 | Anderson | 345/166 |
| 5,414,445 | 5/1995 | Kaneko et al. | 345/163 |
| 5,506,605 | 4/1996 | Paley | 345/163 |
| 5,585,823 | 12/1996 | Duchon et al. | 345/163 |
| 5,657,051 | 8/1997 | Liao | 345/163 |
| 5,670,988 | 9/1997 | Tickle | 345/157 |
| 5,701,142 | 12/1997 | Brown et al. | 345/161 |

Primary Examiner—Jeffery Brier
Attorney, Agent, or Firm—Schwegman, Lundberg, Woessner & Kluth, P.A.; Anthony Claiborne

[57] ABSTRACT

A pointing device for a computer, having switching mechanisms with perceptively differing actuation forces, is disclosed. In one embodiment, the pointing device comprises a housing, a sensor, a first switching mechanism and a second switching mechanism. The sensor is disposed within the housing and translates movement into an electrical signal. The first switching mechanism is also disposed within the housing and has a first predetermined actuation force. The second switching mechanism is also disposed within the housing and has a second predetermined actuation force. The second predetermined actuation force is perceptively different than the first predetermined actuation force.

12 Claims, 7 Drawing Sheets

POINTING DEVICE WITH DIFFERING ACTUATION FORCES FOR PRIMARY AND SECONDARY BUTTONS

FIELD OF THE INVENTION

This invention relates generally to a pointing device for a computer, and more particularly to such a pointing device having differing actuation forces for primary and secondary buttons.

BACKGROUND OF THE INVENTION

As is now typically customary, computers are used with a pointing device, such as a mouse, trackball or touch pad. The pointing device typically permits a user of the computer to control a pointer on the screen, in conjunction with a windows-oriented operating environment such as Microsoft Windows 95. For example, if the user moves the mouse to the left, the pointer correspondingly moves to the left on the screen.

Most pointing devices also usually include at least two switching mechanisms, typically including buttons. These buttons permit the user of the computer to signify to the computer to perform various functions. For example, in the case of Microsoft Windows 95, clicking the left mouse button over a window activates that window. Usually, however, only one of the mouse buttons is the primary button, typically but not always the left mouse button. It is this button that the user uses most. The primary button usually is employed to select windows, pull down menus, highlight text, move the cursor to a new location with a document, etc.

The other, secondary buttons are typically tied to less commonly used functions. For example, in the case of Windows 95, clicking the second mouse button causes the computer to show a "floating" context-sensitive menu rooted at the location of the pointer. In the case of a mouse having a third mouse button between the first and the second buttons, clicking on this button typically causes the computer to respond as if the first (primary) mouse button has been held down, which is commonly referred to as a "click and drag" function.

So that the importance of the first, primary mouse button over the other button or buttons is accentuated, frequently the primary button is larger than the other buttons. Besides providing a visual cue to a user as to which button to press, oversizing the primary button serves another purpose. Oversizing decreases the potential for the user to accidentally click on a secondary button when the user meant to click on the primary button.

However, this functionality is ameliorated by the fact that the actuation force required for a user to click a secondary button is perceptively identical to the force required to click the primary button. A user, therefore, may accidentally click the wrong button, because the buttons in tactile feel and pressure are not perceptively different to the user. This situation is more pronounced in mouses designed for ergonomic reasons so that the user does not have to use significant force in order to click a button. While low actuation force may be desirable for the primary button, low actuation force for the secondary buttons heightens the potential for accidental actuation.

There is a need, therefore, for a mouse or other pointing device for a computer having differing actuation forces for the switching mechanisms or buttons of the pointing device. There is a further need for such a mouse so that a user may easily distinguish between the primary switching mechanism and the secondary switching mechanism or mechanisms. There is yet a further need for such a mouse so that the potential for a user accidentally clicking a secondary switching mechanism is reduced.

SUMMARY OF THE INVENTION

The present invention provides for a pointing device for a computer having buttons with differing actuation forces. In a first embodiment of the invention, a pointing device for a computer comprises a housing, a sensor, and a first and a second switching mechanisms. The sensor is disposed within the housing, and translates movement by a user of the computer to a signal representing a desired corresponding change in the position of a pointer on a display of the computer. The first switching mechanism and the second switching mechanism are both disposed within the housing. Each has a predetermined actuation force, perceptively different from the other.

In this manner, the present invention permits a user of the computer to easily distinguish between the two switching mechanisms, by the differing actuation force required to actuate the mechanisms. The first switching mechanism may be the primary mechanism, and may have an actuation force less than that of the secondary mechanism. In this way, the present invention also reduces the potential for accidental actuation of the secondary mechanism, because the force required to actuate the secondary mechanism is greater than that of the primary mechanism.

In another embodiment of the invention, the pointing device has a third switching mechanism, with a predetermined actuation force different than the force required to actuate the first switching mechanism. This predetermined actuation force may be either equal to or different than the force required to actuate the second switching mechanism, however. In different embodiments of the invention, the pointing device is a mouse, a touch pad, joystick, a point stick, or a trackball. In still other embodiments of the invention, the pointing device is a stand-alone device, or integrated within a computer (such as a laptop computer), or a computer keyboard. Still other and further aspects, advantages and embodiments of the present invention will become apparent in the following description and by reference to the accompanying drawings.

DETAILED DESCRIPTION OF THE INVENTION

Figure 1:
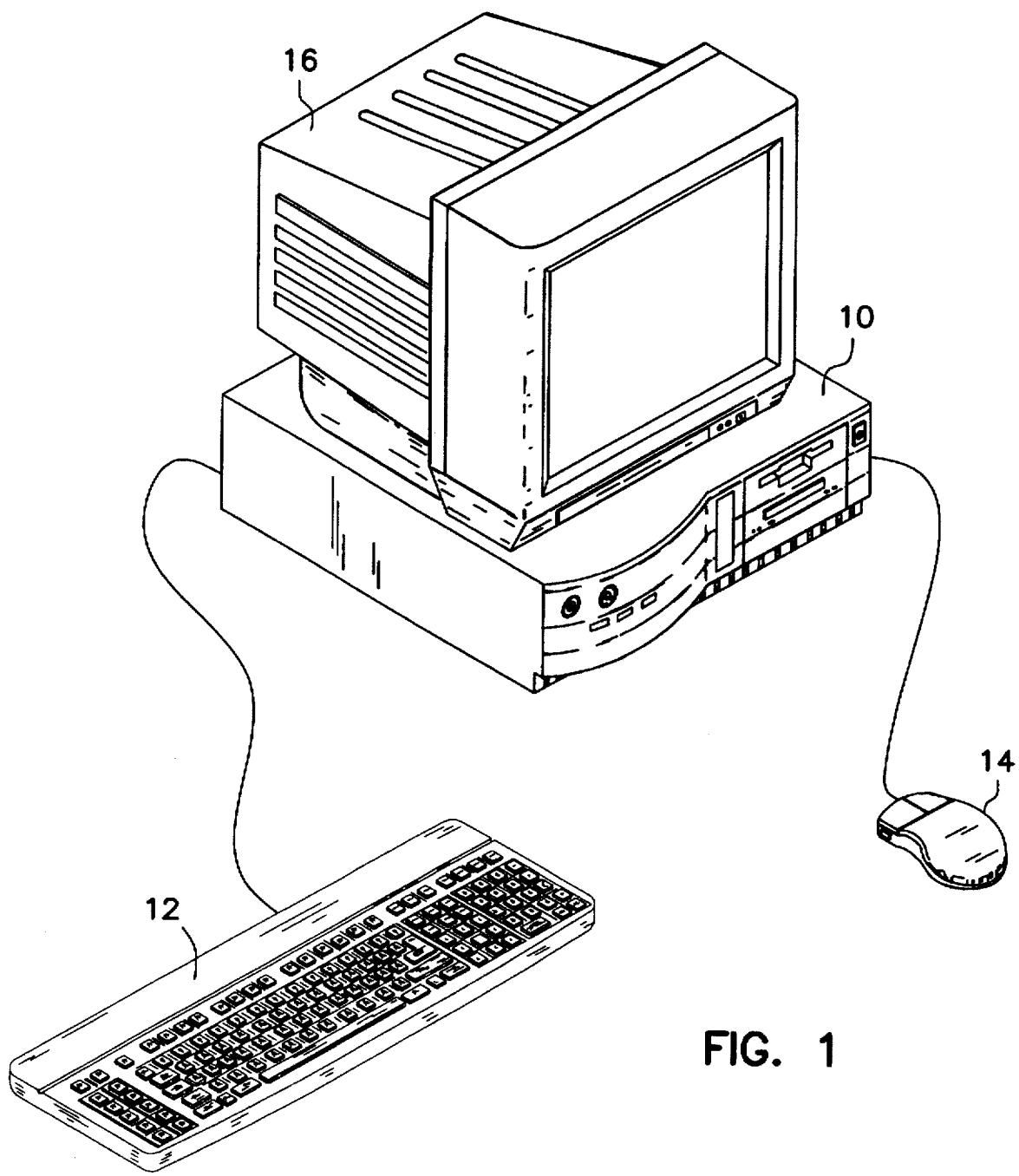
FIG. 1 is a diagram of a computer in conjunction with which the present invention is typically implemented.

The present invention provides for a pointing device for a computer having switching mechanisms with differing actuation forces. The present invention is not limited as to the type of computer in conjunction with which the pointing device is used. A typical example of such a computer is shown in FIG. 1. Computer 10 as shown is a desktop computer, and may be of any type, including a Gateway 2000 P5-166 desktop computer. However, the invention is not so limited, and computer 10 may also be a laptop computer, such as a Gateway Solo laptop computer. Computer 10 usually includes keyboard 12, pointing device 14 and display device 16.

Computer 10 typically has a program running thereon that provides for movement of a pointer on display device 16 in response to the user operating pointing device 14. One such program is Microsoft Windows 95. Display device 16 can be any of a number of different devices, such as a computer monitor employing a cathode ray tube (CRT). Pointing device 14 as shown in FIG. 1 is a mouse, although the invention is not limited to any particular pointing device. For example, pointing device 14 may also be a joystick, wheel, point stick, trackball, or a touch pad.

As shown in FIG. 1, pointing device 14 is an external device. The invention is not so limited, however. In the case of the invention where computer 10 is a laptop computer, pointing device 14 may be integrated within the computer itself, as is known to those of ordinary skill in the art. For example, pointing device 14 may be a touch pad integrated within a laptop computer. In addition, pointing device 14 may be integrated within keyboard 12. Thus, for example, pointing device 14 may be a touch pad integrated within a keyboard.

Pointing device 14 allows a computer user to move the pointer on display device 16. Pointing device 14 therefore translates movement by the user into an electronic signal sent to the computer via a communications link. As shown in FIG. 1, the communications link is a cable connecting the pointing device to the computer. Such a cable is usually integrated within the pointing device itself, and ends in a connector that plugs into a corresponding connector in the back of the computer. This connector may, for example, be a serial nine-pin or twenty-five pin connector that is typically used with PC-compatible computers.

However, the invention is not limited as to the particular manner in which the pointing device communicates with the computer. For example, the pointing device may have an integrated transmitter that allows for wireless communication with a corresponding receiver of the computer. Such a transmitter-receiver combination may provide radio frequency, or infrared, communication, both of which are well known to those of ordinary skill in the art.

Not shown is that computer 10 typically includes a central-processing unit (CPU), a random-access memory (RAM), and a read-only memory (ROM). The CPU, RAM, and ROM may be of any type; the invention is not particularly limited. In one embodiment, the CPU is an Intel Pentium processor, there are sixteen megabytes of RAM, and the ROM contains such functionality as a basic input/output system (BIOS). Also not shown is that computer 10 also usually comprises a fixed storage device such as a hard disk drive, and a removable storage device such as a floppy disk drive.

Figure 2:
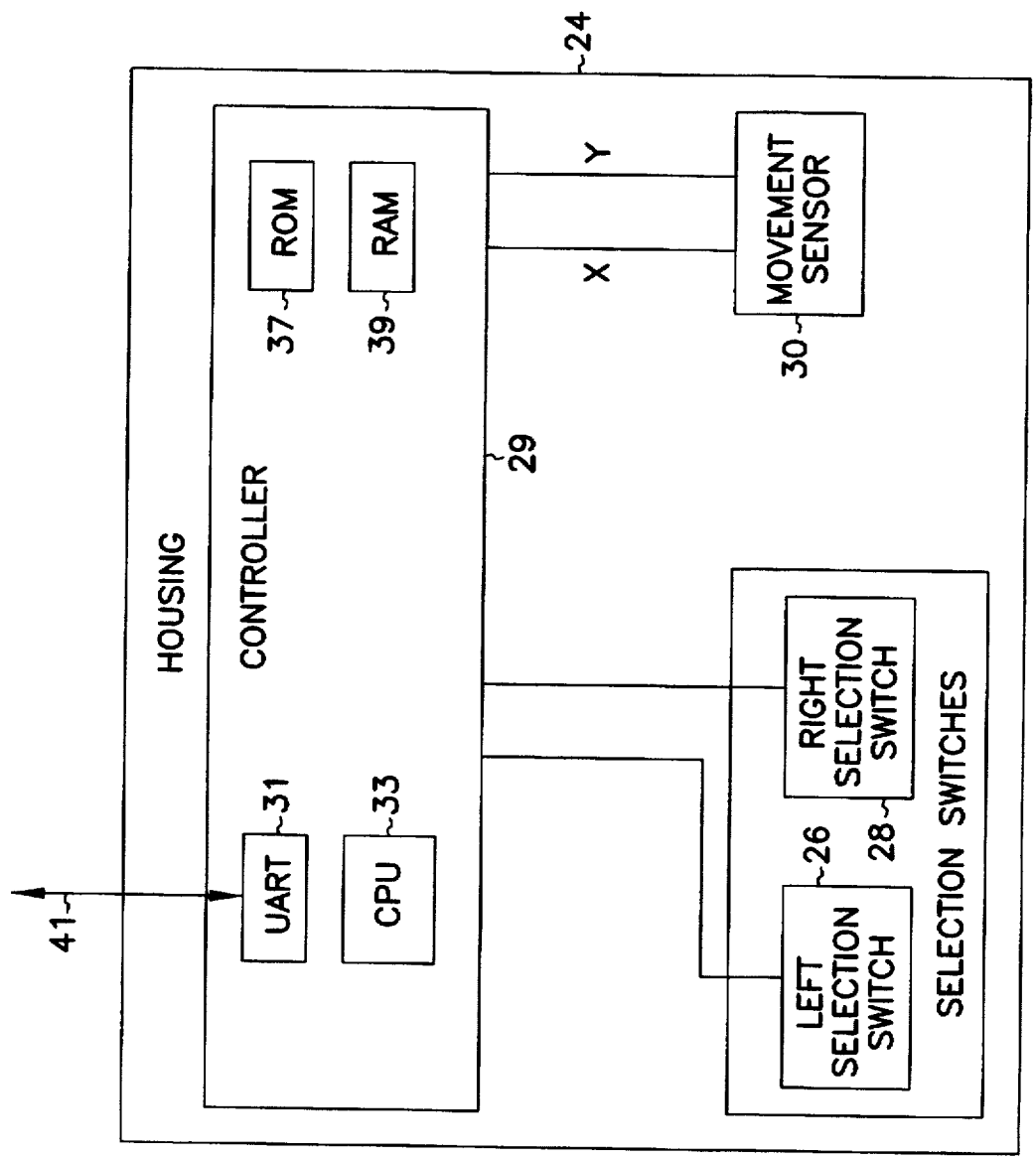
FIG. 2 is a block diagram of a typical pointing device according to the present invention.

Referring now to FIG. 2, a block diagram of a typical pointing device according to the present invention is shown. The pointing device comprises housing 24, switching mechanisms 26 and 28, controller 29 and sensor 30. Each of switching mechanisms 26 and 28 is disposed within housing 24, and is responsive to a different predetermined actuation force. The actuation forces required to actuate the switching mechanisms are different in that they are perceptively different to a user. When a user clicks on a switching mechanism with a force greater than its particular predetermined actuation force, an electronic signal is sent to the computer that the switching mechanism has been depressed. In response to this signal, the computer typically performs a function, such as selecting a window, dropping down a menu, etc. The invention is not limited to any particular switching mechanism 26 or 28; in one embodiment, each mechanism includes a button and a switch.

The present invention is also not limited to the manner in which switching mechanisms 26 and 28 have differing predetermined actuation forces. Because the actuation forces are different, however, the invention provides for a number of advantages. A user of the computer is more easily able to distinguish between the switching mechanisms because of the difference in the force required to actuate each of them. Furthermore, in the case where switching mechanism 26 is the primary mechanism and has a predetermined actuation force less than that of switching mechanism 28, which is the secondary mechanism, there is less potential for the user to accidentally actuate secondary mechanism 28.

Still referring to FIG. 2, sensor 30 is also disposed within housing 24. Sensor 30 detects movement by a user of the computer, and translates this movement to an electronic signal for transmission to the computer. In response to this signal, the computer also typical performs a function, such as moving a pointer on the display device of the computer in a corresponding direction. The present invention is also not limited to any particular sensor 30. The particular sensor 30 used depends on the type of pointing device. As will be described, for example, sensor 30 may include a rotatable ball in the case where the pointing device is a mouse or a trackball, or a touch-responsive pad in the case where the pointing device is a touch pad.

Controller 29 of FIG. 2 provides for processing the signals sent by switches 26 and 28 and sensor 30 for transmission to the computer via communications link 41. In one particular embodiment of the invention, controller 29 includes UART 31, central processing unit (CPU) 33, read-only memory (ROM) 37, and random-access memory (RAM) 39, as commonly understood by those of ordinary skill within the art. CPU 33, in conjunction with ROM 37 and RAM 39, receives and processes digital data (i.e., digital inputs) from switching mechanisms 26 and 28 and sensor 30, and sends them to the computer to which the pointing device is attached from UART 31 via communications link 41. UART 31 is a Universal Asynchronous Receiver Transmitter, typically a chip device, that controls serial communication originating from and received by controller 29. ROM 37 contains the firmware which controls the operation of switching mechanism 26 and 28, and movement sensor 30. CPU 33 executes this firmware, using RAM 39 for temporary storage as necessary. This embodiment of the present invention is not limited to controller 29 having any particular CPU 33, ROM 37, RAM 39, or UART 31. Controller 29 in one embodiment is an integrated circuit (IC).

Figure 3A:
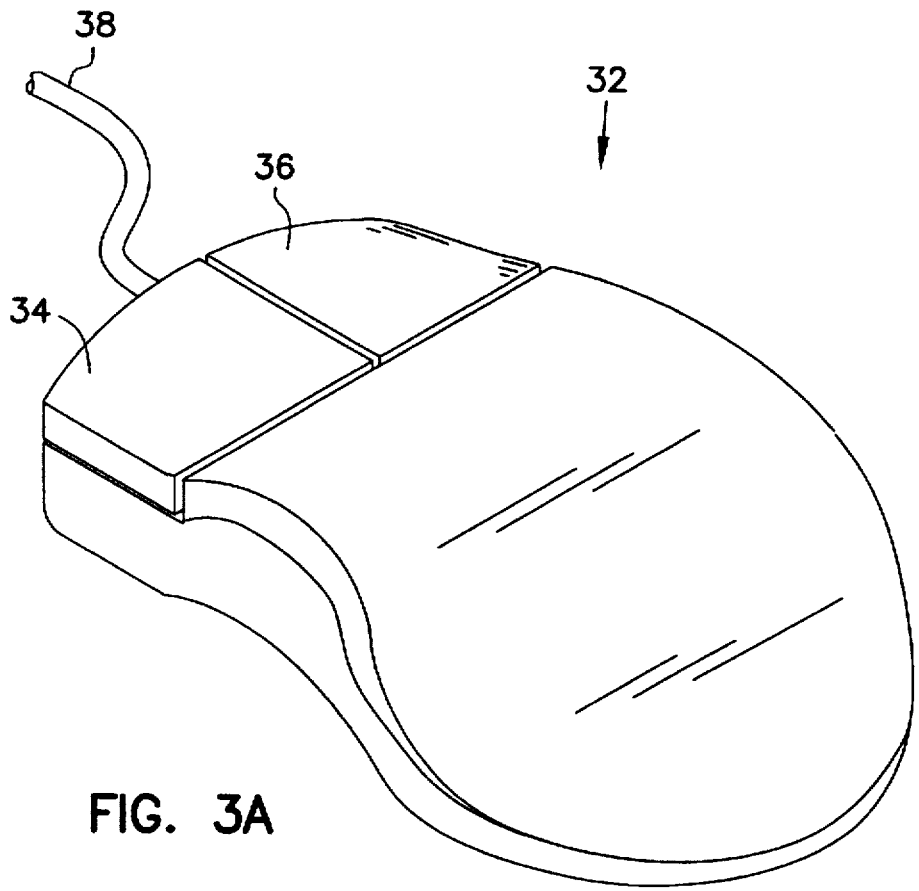
FIG. 3A is a top view of a mouse, which is one specific type of pointing device as depicted in FIG. 2.

Referring now to FIG. 3A, a diagram of one particular pointing device, a mouse, is shown. A mouse is a device that has freedom of movement within a two-dimensional plane. The mouse detects the direction, and typically the speed, in which the user is moving the device, and conveys this information to the computer. The computer then moves the pointer on the screen in the corresponding direction, with the corresponding speed. The mouse typically allows for clicking via one or more separate buttons located on the mouse.

As shown in FIG. 3A, the mouse comprises housing 32, buttons 34 and 36, and cable 38. Cable 38 is the communications link of the mouse pointing device shown in FIG. 3A. Not shown is that cable 38 typically ends in a connector for plugging into a corresponding connector on the back of a computer. Buttons 34 and 36 are components of the particular switching mechanisms of the mouse, which correspond to switching mechanisms 26 and 28 of FIG. 2, and thus which have differing predetermined actuation forces. Buttons 34 and 36 are disposed within housing 32, which corresponds to housing 24 of FIG. 2.

Figure 3B:
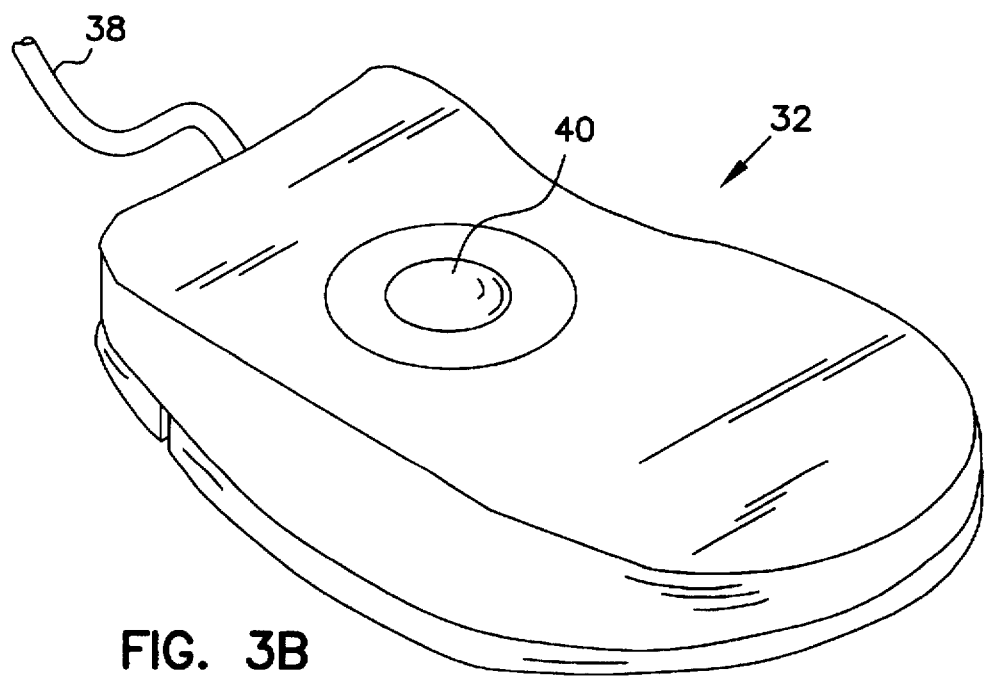
FIG. 3B is a bottom view of the mouse shown in FIG. 3A.

Referring now to FIG. 3B, the bottom view of the mouse of FIG. 3A is shown. In a cavity in the bottom of housing 32, tactile ball 40 is disposed. Moving the mouse on a flat plane causes ball 40 to rotate within the cavity. Not shown is that the mouse includes one or more mechanisms to detect the ball's rotation, and translate that rotation to an electrical signal for transmission to the computer via the communications link. These mechanisms, in addition to the tactile ball, make up the sensor for the mouse, as that sensor corresponds to sensor 30 of FIG. 2. Therefore, the sensor translates movement of the mouse into an electrical signal.

In the case where the mouse of FIG. 3A is an optical mouse, the sensor of the mouse does not include a rotatable ball as shown in FIG. 3B, but rather an optical sensor. When the mouse is moved on a flat plane having a suitable grid of lines drawn thereon, the optical sensor detects when the mouse has been moved over a particular line, and translates this information to an electrical signal corresponding to the speed and direction in which the mouse is being moved. This signal is then transmitted to the computer via the communications link.

Figure 4:
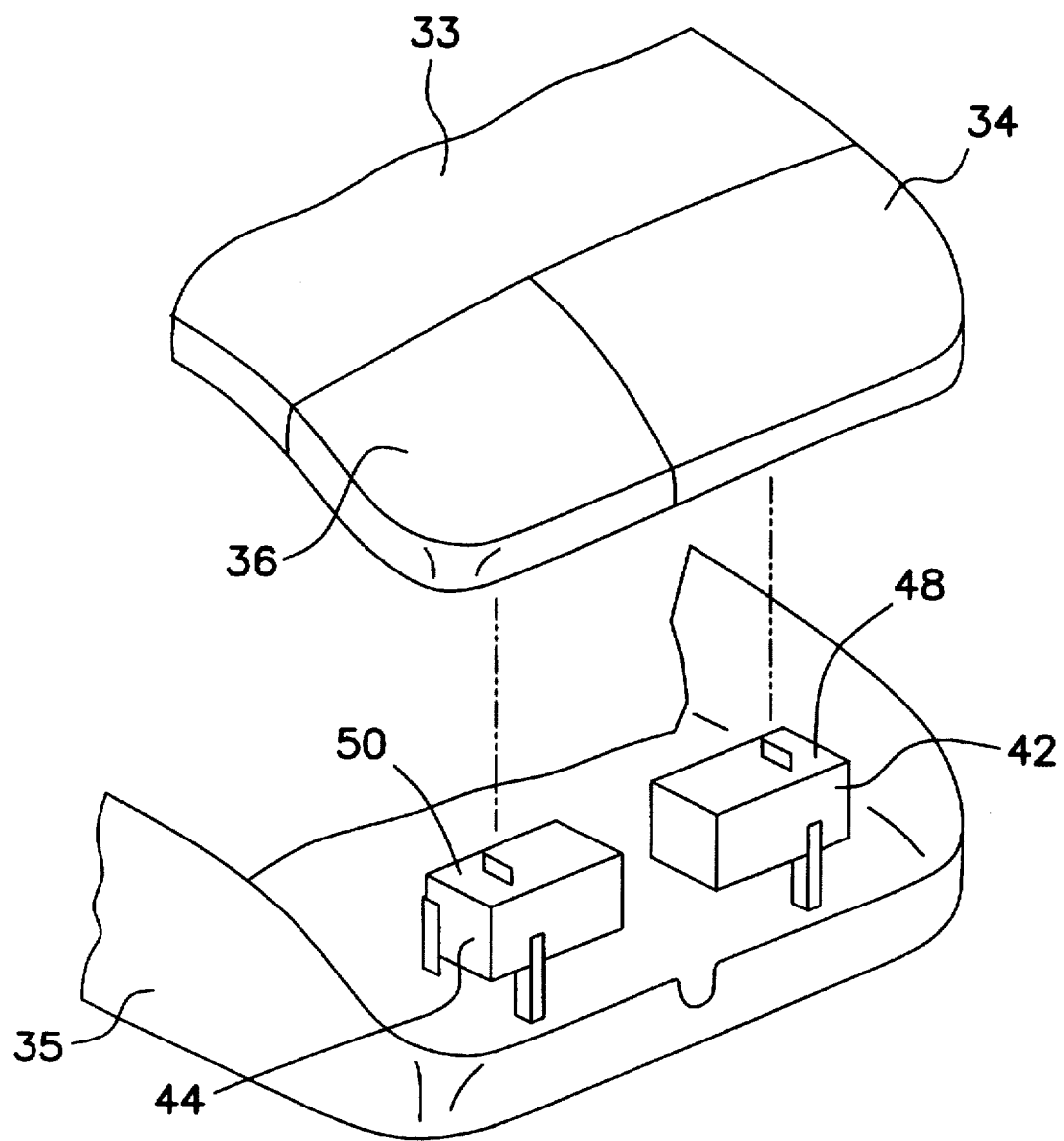
FIG. 4 is an exploding perspective view showing in detail the switching mechanisms within the mouse of FIG. 3A.

Referring now to FIG. 4, the mouse of FIG. 3A is shown in more detail via an exploding perspective view. As shown in FIG. 4, the upper portion 33 of housing 32 of FIG. 3A is lifted up from its lower portion 35. That is, upper portion 33 and lower portion 35 of FIG. 4 make up housing 32 of FIG. 3A. Underneath each of buttons 34 and 36 is a switch. Particularly, switch 42 lies underneath button 34, and switch 44 lies underneath button 36. The pair of switch and button are components of a switching mechanism for the mouse. Thus, switch 42 and button 34 are components of one switching mechanism of the mouse, and switch 44 and button 36 are components of another switching mechanism of the mouse. The switching mechanisms of the mouse correspond to switching mechanisms 26 and 28 of FIG. 2.

Each of switches 42 and 44 are mounted to the bottom portion 35. Upon the user clicking on a button of the mouse with a force greater than that required to actuate it, the button presses down on the actuating member of its corresponding switch. With respect to button 34, for example, a user clicking on the button with a force greater than that required to actuate it causes button 34 to actuate actuating member 48 of switch 42. In the case of button 36, a user clicking on the button with a force greater than that required to actuate it causes button 36 to actuate actuating member 50 of switch 44.

As those of ordinary skill in the art can appreciate, the invention is not limited to any particular switch 42 or 44. As shown in FIG. 4, switches 42 and 44 are identical to one another, except for the force required to actuate them. That is, the force required to actuate actuating member 48 of switch 42 is different than the force required to actuate actuating member 50 of switch 44. In one particular embodiment of the invention, each of switches 42 and 44 is a PC-mount single-pole, double-throw switch, such as those available from Omron as a D2F series switch, having a contact rating of 0.1 amps and measuring 0.5 inch in length. In this embodiment, one of the switches is Omron part number D2F-01 having an actuation force of 150 grams-force(gf), whereas another of the switches is Omron part number D2F-01F having an actuation force of 75 grams-force (gf).

Figure 5A:
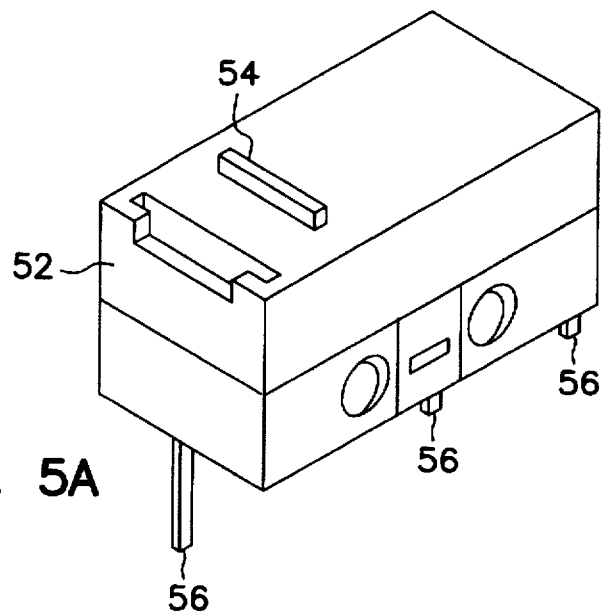
FIG. 5A is a perspective view of a switch of one of the switching mechanisms, by itself, of FIG. 4.
Figure 5B:
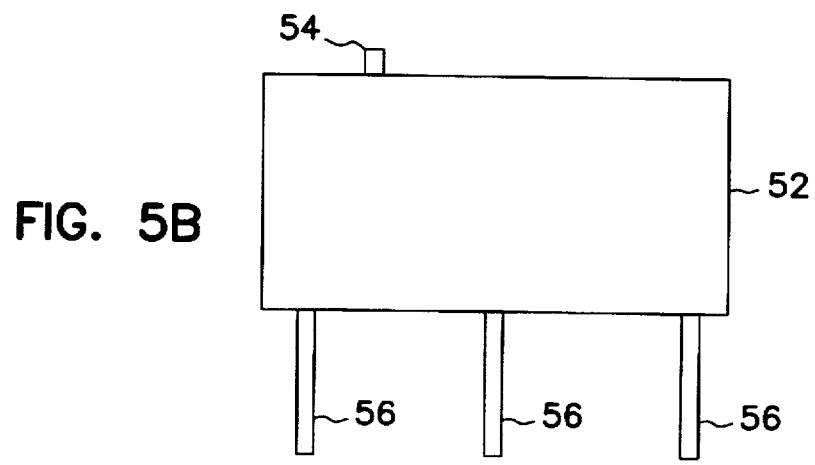
FIG. 5B is a side view of the switch shown in FIG. 5A.
Figure 5C:
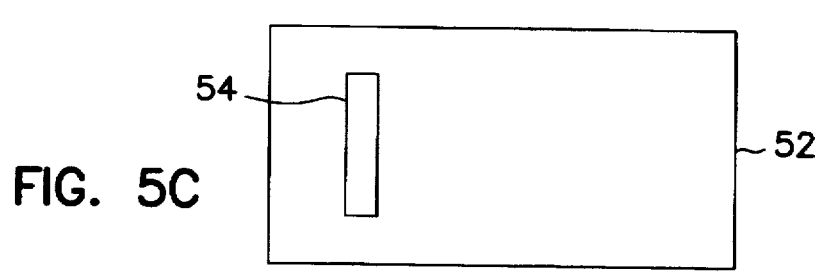
FIG. 5C is a top view of the switch shown in FIG. 5A.

Referring now to FIG. 5A, FIG. 5B, and FIG. 5C, a switch is shown in more detail. Switch 52 corresponds to either switch 42 or switch 44 of FIG. 4. FIG. 5A shows a perspective view of switch 52, FIG. 5B shows a side view of switch 52, and FIG. 5C shows a top view of switch 52. Switch 52 has protruding from the top thereof actuating member 54, which corresponds to actuating member 48 in the case of switch 42 of FIG. 4, or actuating member 50 in the case of switch 44 of FIG. 4. Applying a force to actuating member 54 greater than its predetermined actuation force (for example, 75 or 150 gpf) causes the member to actuate. Switch 52 also has leads 56. As shown, the leads provide for mounting on a circuit board, and there are three leads in the case where switch 52 is single pole, double throw.

Thus, as has been described and shown in FIGS. 5A-5C, a mouse according to 3(a)-5(c) the present invention has two switching mechanisms, each comprising at least a button and a switch, such that each switching mechanism has a different actuation force. In this manner, a user of the computer must apply a different amount of force to click each button, which permits the user to distinguish the buttons, and wards against accidental clicking of the button with a greater predetermined actuation force. As those skilled in the art can appreciate, however, the present invention is not limited to a mouse, or the particular switching mechanisms, switches, or buttons as shown. Any pointing device having switching mechanisms with perceptively different actuation forces is within the scope of the present invention.

Figure 6:
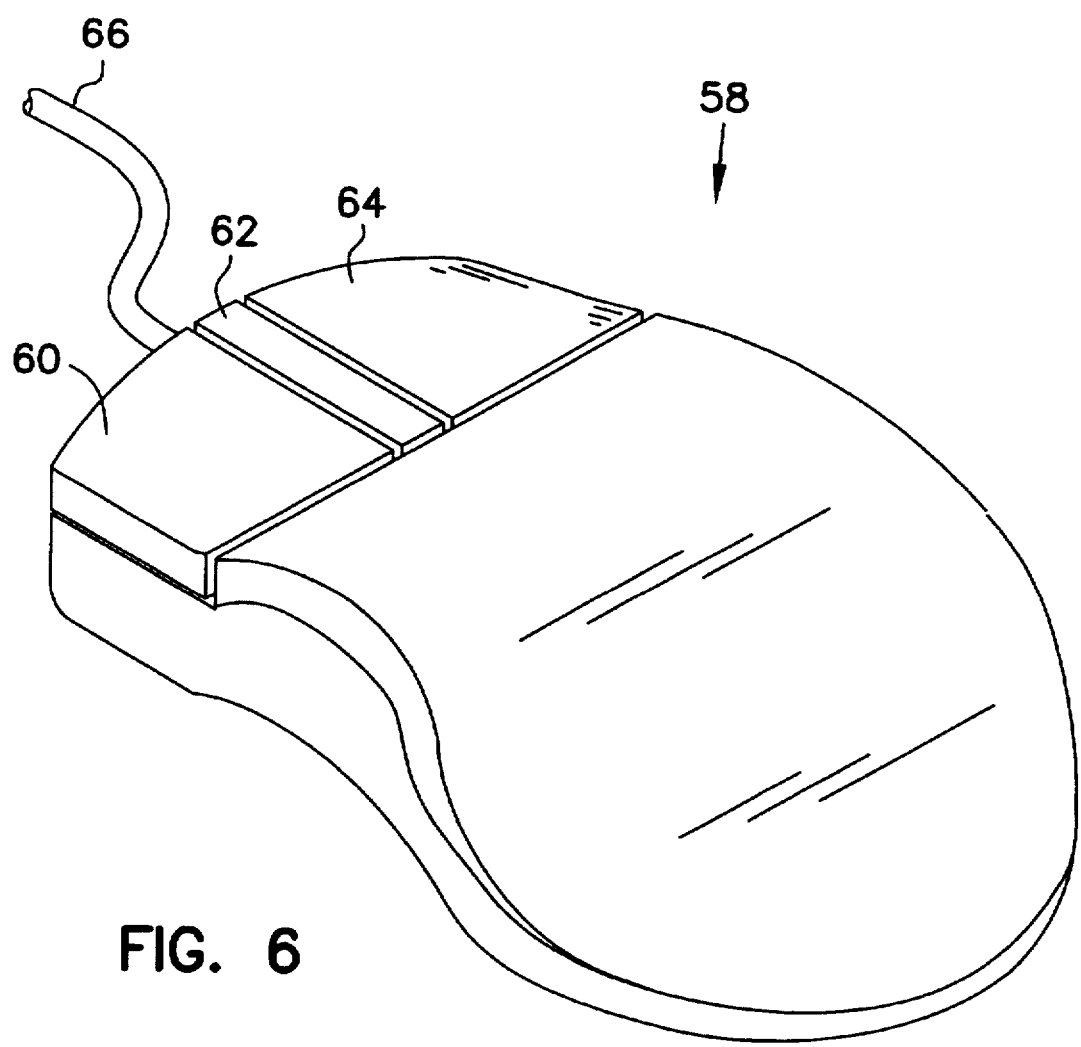
FIG. 6 is a diagram of another specific implementation of the pointing device of FIG. 2, a mouse having three buttons.

Referring now to FIG. 6, another embodiment of the invention is shown. The mouse of FIG. 6 differs from that of FIG. 3A in that it has an extra mouse button. As shown in FIG. 6, the mouse comprises housing 58, corresponding to housing 32 of FIG. 3A, in which buttons 60, 62, and 64 are disposed. The mouse also includes cable 66, which acts as a communications link with the computer. Not shown is that cable 66 typically ends in a connector for plugging into a corresponding connector on the back of a computer. Cable 66 corresponds to cable 38 of FIG. 3A.

The actuation force necessary to click each of buttons 60, 62 and 64 differ from one another. Thus, button 60 may be seen as corresponding to button 34 of FIG. 3A, and button 64 may be seen as corresponding to button 36 of FIG. 3A, in which case button 66 is an additional third button, having an actuation force perceptively different than that of button 34, and perceptively different than or perceptively equal to that of button 36. Except for the additional third button, the mouse of FIG. 6 is similar to that of FIG. 3A, and reference should be made to the discussion in conjunction with FIG. 3A for further understanding thereto.

As is the case with the mouse shown in FIG. 3A, the mouse shown in FIG. 6 can either be mechanical or optical. In the case where the mouse is mechanical, the bottom view of the mouse is similar to the bottom view shown in FIG. 3B. A tactile ball is disposed within a cavity on the bottom of the housing, so that moving the mouse on a flat plane causes the ball to rotate within the cavity. One or more mechanisms detect the ball's rotation, and translate that rotation to an electrical signal for transmission to the computer. In the case where the mouse is optical, an optical sensor detects when the mouse has been moved over a particular line on a suitable grid of lines. The optical sensor translates this information to an electrical signal, which is then transmitted to the computer.

Figure 7:
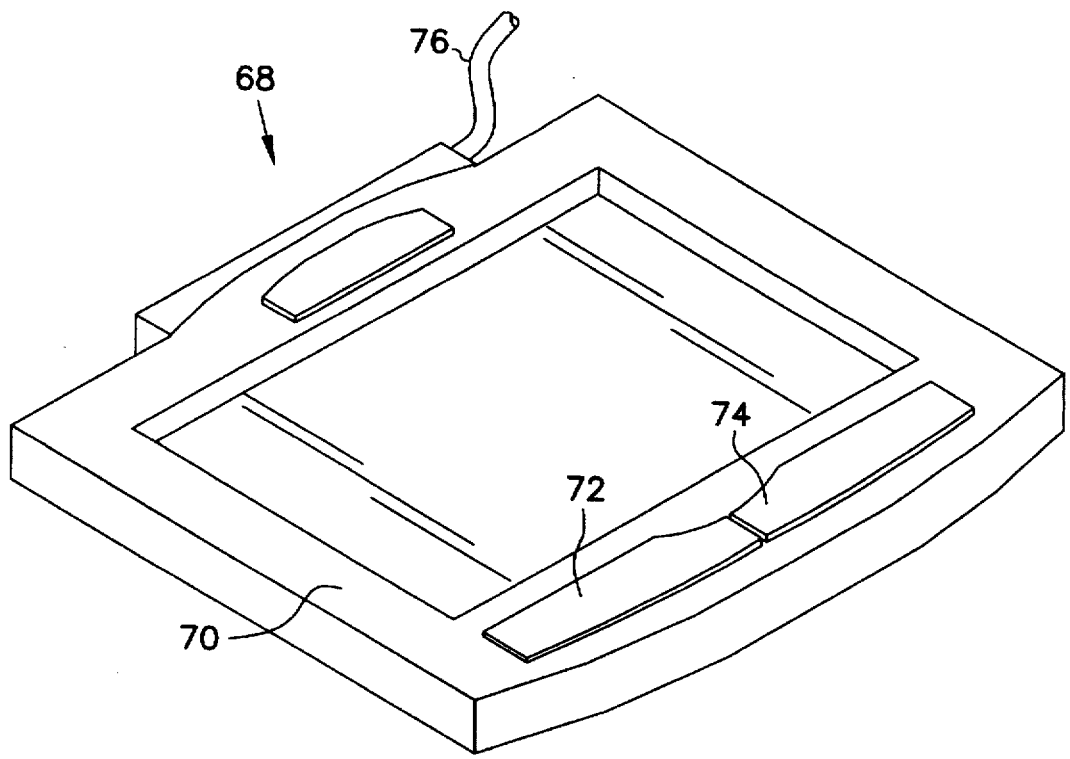
FIG. 7 is a diagram of yet another specific implementation of the pointing device of FIG. 2, a touch pad; and, FIG. 8 is a diagram of still yet another specific implementation of the pointing device of FIG. 2, a trackball.

Referring now to FIG. 7, another embodiment of the invention is shown, a touch pad pointing device. A touch pad is a touch-sensitive pad. The pad detects the positions at which the user is moving his or her finger on the pad, and conveys this information to the computer. The computer than typically moves a pointer based on this information. The touch pad allows for clicking via one or more separate buttons located on the device.

As shown in FIG. 7, the touch pad comprises housing 68, touch-sensitive pad 70, buttons 72 and 74, and cable 76. Cable 76 is the communications link of the touch pad pointing device shown in FIG. 7. Not shown is that cable 76 typically ends in a connector for plugging into a corresponding connector on the back of a computer. Buttons 72 and 74 are components of the particular switching mechanisms of the touch pad, which correspond to switching mechanisms 26 and 28 of FIG. 2, and thus have differing predetermined actuation forces. Buttons 72 and 74 are disposed within housing 68, which corresponds to housing 24 of FIG. 2.

The sensor for the touch pad device, corresponding to sensor 30 of FIG. 2, includes touch-sensitive pad 70, and a translating mechanism (not shown). The translating mechanism, as those skilled in the art readily understand, translates movement by a user of the computer on pad 70 to a signal representing a desired corresponding change in the position of a pointer on the display device of the computer. The signal representing this information is transmitted to the computer via the communications link.

Figure 8:
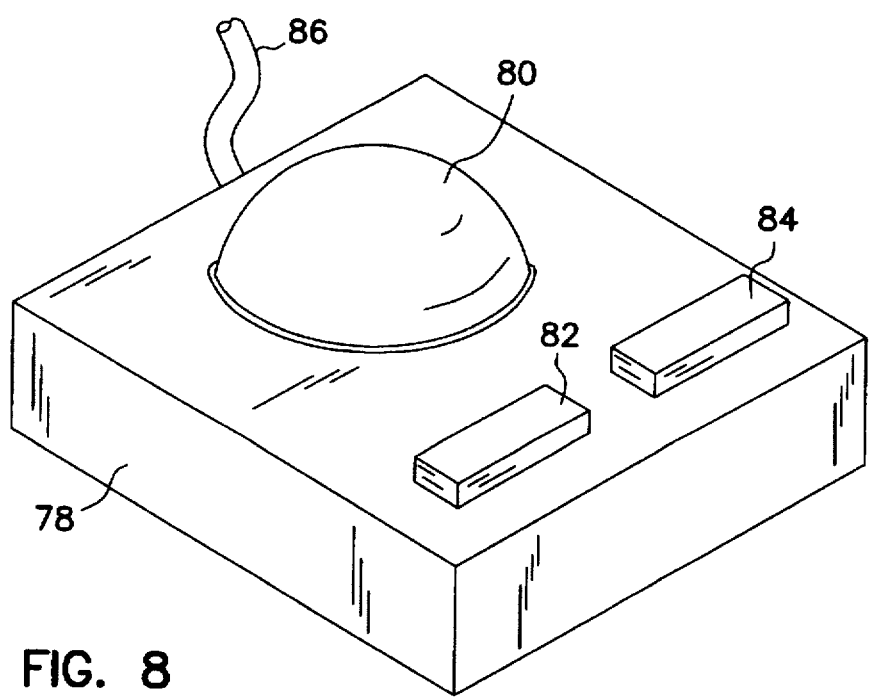

Referring finally to FIG. 8, still yet another embodiment of the invention is shown, a trackball pointing device. A trackball is a stationary device in which a rotatable ball is partially disposed within a cavity of the device. A user of the device can spin the ball within the cavity. The trackball detects the direction, and typically the speed, in which the user is spinning the ball, and conveys this information to the computer. The computer then moves the pointer on the screen in the corresponding direction, with the corresponding speed. The trackball typically allows for clicking via one or more separate buttons located on the device.

As shown in FIG. 8, the trackball comprises housing 78, rotatable ball 80, buttons 82 and 84, and cable 86. Cable 86 is the communications link of the trackball pointing device shown in FIG. 8. Not shown is that cable 86 typically ends in a connector for plugging into a corresponding connector on the back of a computer. Buttons 82 and 84 are components of the particular switching mechanisms of the trackball, which correspond to switching mechanisms 26 and 28 of FIG. 2, and thus have differing predetermined actuation forces. Buttons 82 and 84 are disposed within housing 78, which corresponds to housing 24 of FIG. 2.

The sensor for the trackball pointing device, corresponding to sensor 30 of FIG. 2, includes rotatable ball 80, and a translating mechanism (not shown). Rotatable ball 80 is disposed within a cavity of housing 78. The translating mechanism, as those skilled in the art readily understand, translates rotation of ball 80 by a user of the computer to a signal representing a desired corresponding change in the position of a pointer on the display device of the computer. The signal representing this information is transmitted to the computer via the communications link.

Those of ordinary skill in the art will readily appreciate that many changes and modifications to the above drawings and description can be made without departure from the sprit or scope of the following claims. For example, the invention as shown in FIG. 8 is a trackball having two buttons; however, a trackball having three buttons is also within the scope of the following claims. For further example, the invention as shown in FIG. 4 has a switching mechanism with a particular type of switch; however, a switching mechanism of a pointing device having a different type of switch is also within the scope of the following claims.

I claim:

1. A mouse for a computer, comprising:

a housing having a plurality of surfaces including at least a top surface and a plurality of side surfaces;

a first button disposed within one of the plurality of surfaces of the housing, and having a predetermined shape;

a second button disposed within the same one of the plurality of surfaces of the housing in which the first button is disposed, and having a predetermined shape substantially the same as the predetermined shape of the first button;

a sensor disposed within the housing to translate movement of the mouse into an electrical signal;

a first switching mechanism disposed within the housing underneath the first button such that the first button requires a first predetermined force applied thereto to actuate the first switching mechanism; and, a second switching mechanism disposed within the housing underneath the second button such that the second button requires a second predetermined force applied thereto to actuate the second switching mechanism where the second predetermined force is different than the first predetermined force.

2. The mouse of claim 1, further comprising:

a third button disposed within the housing; and, a third switching mechanism disposed within the housing underneath the third button such that the third button requires a third predetermined force applied thereto to actuate the third switching mechanism, where the third predetermined force is different than the first predetermined force.

3. The mouse of claim 2, wherein the third predetermined force is also different than the second predetermined force.

4. The mouse of claim 1, wherein the sensor comprises a mechanism responsive to movement of the mouse on a flat surface.

5. The mouse of claim 1, wherein the sensor comprises:

a rotatable ball disposed within a cavity of a bottom surface of the housing, such that the ball rotates within the cavity incident to movement of the mouse on a flat surface by the user; and, a mechanism responsive to rotation of the ball.

6. The mouse of claim 1, wherein the sensor is an optical sensor.

7. The mouse of claim 6, wherein the sensor detects movement of the mouse on a flat surface relative to a grid of lines on the flat surface.

8. A pointing device for a computer, comprising:

a housing having a plurality of surfaces including at least a top surface and a plurality of side surfaces;

a sensor disposed within the housing to translate movement by a user of the computer to a signal representing a desired corresponding change in the position of a pointer on a display of the computer;

a first button disposed within one of the plurality of surfaces of the housing, and having a predetermined shape;

a second button disposed within the same one of the plurality of surfaces of the housing in which the first button is disposed, and having a predetermined shape substantially the same as the predetermined shape of the first button;

a first switching mechanism disposed within the housing underneath the first button such that the first button requires a first predetermined force applied thereto to actuate the first switching mechanism;and, a second switching mechanism disposed within the housing underneath the second button such that the second button requires a second predetermined force applied thereto to actuate the second switching mechanism where the second predetermined force is different than the first predetermined force.

9. The pointing device of claim 8, further comprising:

a third button disposed within the housing; and, a third switching mechanism disposed within the housing underneath the third button such that the third button requires a third predetermined force applied thereto to actuate the third switching mechanism, where the third predetermined force is different than the first predetermined force.

10. The pointing device of claim 8, wherein the pointing device is selected from the group consisting of a mouse, a touch pad, a trackball, a joystick, and a point stick.

11. The pointing device of claim 8, wherein the housing encases the computer having at least a processor.

12. The pointing device of claim 8, wherein the housing comprises a keyboard for the computer and supports at least a plurality of keys.

* * * * *